United States Patent [19]

Ford

[11] Patent Number: 4,702,620
[45] Date of Patent: Oct. 27, 1987

[54] METHODS OF AND APPARATUS FOR TESTING INTERNAL COMBUSTION ENGINES BY MONITORING THE COOLING SYSTEMS THEREOF

[75] Inventor: Curtis A. Ford, Jamaica, N.Y.

[73] Assignee: Autotec International, Inc., St. Albans, N.Y.

[21] Appl. No.: 857,220

[22] Filed: Apr. 29, 1986

Related U.S. Application Data

[63] Continuation-in-part of Ser. No. 719,883, Apr. 4, 1985, abandoned.

[51] Int. Cl.$^4$ .............................................. G01K 3/04
[52] U.S. Cl. .................................... 374/145; 374/102
[58] Field of Search ................ 374/145, 102; 340/592; 324/115

[56] References Cited

U.S. PATENT DOCUMENTS

| | | | |
|---|---|---|---|
| 1,542,096 | 6/1925 | Riblet | 340/57 |
| 3,044,296 | 7/1962 | Boddy | 374/145 X |
| 3,262,314 | 7/1966 | Gregg | 374/145 X |
| 3,946,364 | 3/1976 | Codomo et al. | 374/102 X |
| 4,069,712 | 1/1978 | Armstrong et al. | 374/145 X |
| 4,254,375 | 3/1981 | Matsuoka | 324/115 |
| 4,393,365 | 7/1983 | Kondo et al. | 340/59 X |
| 4,503,419 | 3/1985 | Kidd et al. | 340/59 X |
| 4,587,931 | 5/1986 | Duprez | 374/145 X |
| 4,598,581 | 7/1986 | Brekke | 374/145 |

*Primary Examiner*—Daniel M. Yasich
*Attorney, Agent, or Firm*—Millen & White

[57] ABSTRACT

An electronic thermostat tester monitors the heat rise of the coolant in the radiator of an internal combustion engine as a function of time and provides "defect" signals if the heat does not reach a preselected level (160° F.) in a predetermined time period (eight minutes). The electronic thermostat tester can also be used with bulldozers, buses, tractors and other heavy-duty equipment. When use with heavy-duty engines, the time intervals will be longer. If the preselected heat range is reached within the time period a light indicates that the thermostat is functioning properly. The tester further includes a plurality of indicating lights for thermostat levels (180° F. and 190° F.) above the preselected heat level (160° F.) for engines having different ratings. By using this thermostat tester one does not have to remove the thermostat from an engine to test the thermostat. In addition, the tester may be used to detect clogged engine blocks, radiators and defective automatic fans.

14 Claims, 9 Drawing Figures

METHODS OF AND APPARATUS FOR TESTING INTERNAL COMBUSTION ENGINES BY MONITORING THE COOLING SYSTEMS THEREOF

RELATED PATENT APPLICATIONS

This application is a continuation-in-part of U.S. patent application Ser. No. 719,883, filed Apr. 4, 1985, in the name of Curtis A. Ford and assigned to Autotec International, Inc., a corporation of New York, (now abandoned).

BACKGROUND OF THE INVENTION

1. Field of the Invention

The instant invention relates to methods of and apparatus for testing internal combustion engines. More particularly, the instant invention relates to electronic testers which monitor the cooling systems of liquid cooled, internal combustion engines to locate malfunctioning components therein.

2. Technical Considerations and Prior Art

The proper function of cooling systems is necessary for proper functioning of internal combustion engines. The usual course of cooling system malfunction is a faulty thermostat, however, the malfunction can also be a clogged block or radiator, or a faulty clutch fan or a faulty automatic electric fan.

Considering thermostats first, in internal combustion engines, thermostats are essential to the engine's proper performance since the thermostat controls an engine's temperature. When an engine is operated too cold, excessive condensation, sludge formation, hesitation and poor fuel economy may occur. If the engine is operated at too high a temperature, there is a danger of premature ignition, stumbling, burned valves and perhaps serious damage to pistons, cylinders and other vital engine parts.

Thermostats are very simple, inexpensive automotive parts which are readily removable from the cooling system of an engine. Accordingly, the general method of testing thermostats is to first remove the thermostat from the engine and thereafter place the thermostat in a container of water in which there is also a thermometer. The container of water is heated to the rated temperature of the thermostat and the thermostat is visually inspected to see if it has opened at the rated temperature. This is, of course, a cumbersome and time consuming procedure which requires considerable time and effort. Accordingly, the mechanics and do-it-yourself automobile owners simply replace a thermostat if there appears to be difficulty with an engine's cooling system. However, the thermostat may not be the cause of overheating or cold operating temperatures and the thermostat may have been replaced needlessly while the problem still persists. In addition, the currently used test does not test the thermostat under engine operating conditions. Accordingly, the test is not necessarily accurate.

Testing the cooling systems and thermostats of heavy-duty equipment, such as buses, bulldozers, etc., is even more time consuming, difficult and costly than testing passenger cars in that it frequently takes two and one-half to six hours or more to complete a test.

The prior art has recognized the deficiencies in the aforementioned test method and attempts have been made to provide devices for testing thermostats while the thermostats are still installed in engine cooling systems. U.S. Pat. Nos. 3,262,314 and 4,069,712 are exemplary of these approaches. Considering U.S. Pat. No. 3,262,314, first it is seen that this patent utilizes an obsolete bridge circuit to analyze temperature data from the engine. Moreover, the display is rather inconvenient to interpret and requires considerable mental effort. In addition, the device of this patent requires one to hook two temperature sensors to the automobile engine rather than one. Finally the testing device is not necessarily simply operated from the automobile's battery.

U.S. Pat. No. 4,069,712 issued to Armstrong et al and assigned to United Technologies Corporation discloses a complex, expensive computerized thermostat tester in which it is necessary to coordinate engine speed and pressure readings with temperature readings in order to test an engine's thermostat. This is obviously an expensive and perhaps unreliable system which requires considerable skill to utilize. The expense of the device disclosed in U.S. Pat. 4,069,712 places it beyond the needs or reach of the small repair shop or do-it-yourselfer.

Cooling system problems can also result from a clogged block or defective radiator. The prior art does not disclose a system which tests for these defects, as well as a defective thermostat. Modern engines utilize either clutch fans or automatic electric fans to cool liquid coolant in the radiators of the engines. The prior art does not disclose a system which can also test for defective fans during a thermostat test.

Accordingly, there is a need for an electronic thermostat tester which is accurate, very inexpensive, easy to use and reliable.

SUMMARY OF THE INVENTION

In view of the aforementioned considerations, it is an object of the instant invention to provide a new and improved thermostat tester which is accurate, inexpensive, reliable and easy to operate and can also be used to test for defective radiators and clogged blocks as well as defective clutch fans or defective automatic electric fans.

In order to accomplish the aforementioned object, the instant invention contemplates an electronic thermostat tester for a liquid-cooled internal combustion engine which includes a heat sensor which is placed in a radiator associated with the engine, which sensor is connected to both an under-range switch and at least one outer-range switch. The under-range switch goes off when the engine's coolant creates a certain amount of heat. A delayed-ON switch comes on at the time a good thermostat is supposed to open. If the delayed ON switch comes before the under temperature switch goes OFF, a signal is emitted indicating that the thermostat is defective. If the under heat switch goes OFF before the delayed switch comes ON, a signal is emitted indicating that the thermostat is good.

Outer range switches indicating thermostat ratings of 160° F., 180° F., 195° F. and 210° F. are provided along with indicating devices for these ranges: 160° F., 180° F. and 195° F. By running the engine an additional time interval, one can determine if the engine is operating at its rated thermostat.

Preferably, the indicators include a lamp which comes ON if the thermostat is good and a lamp and a buzzer which are lit and energized if the thermostat is defective. Moreover, lamps may be conveniently used to indicate whether or not the thermostat is 160°, 180° or 195° thermostat.

Preferably, the thermostat tester is powered by a 12-volt battery supply circuit which is simply connected to the terminals of the battery in the vehicle under test.

By monitoring selected indicators for selected time periods an engine may be tested for a clogged block, defective radiator and defective fan clutch or electric fan utilizing the aforedescribed thermostat tester.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein:

FIG. 3A is a circuit diagram showing a typical switching circuit used as an under-range switch while

DESCRIPTION OF THE PREFERRED EMBODIMENT

Figure 1A:
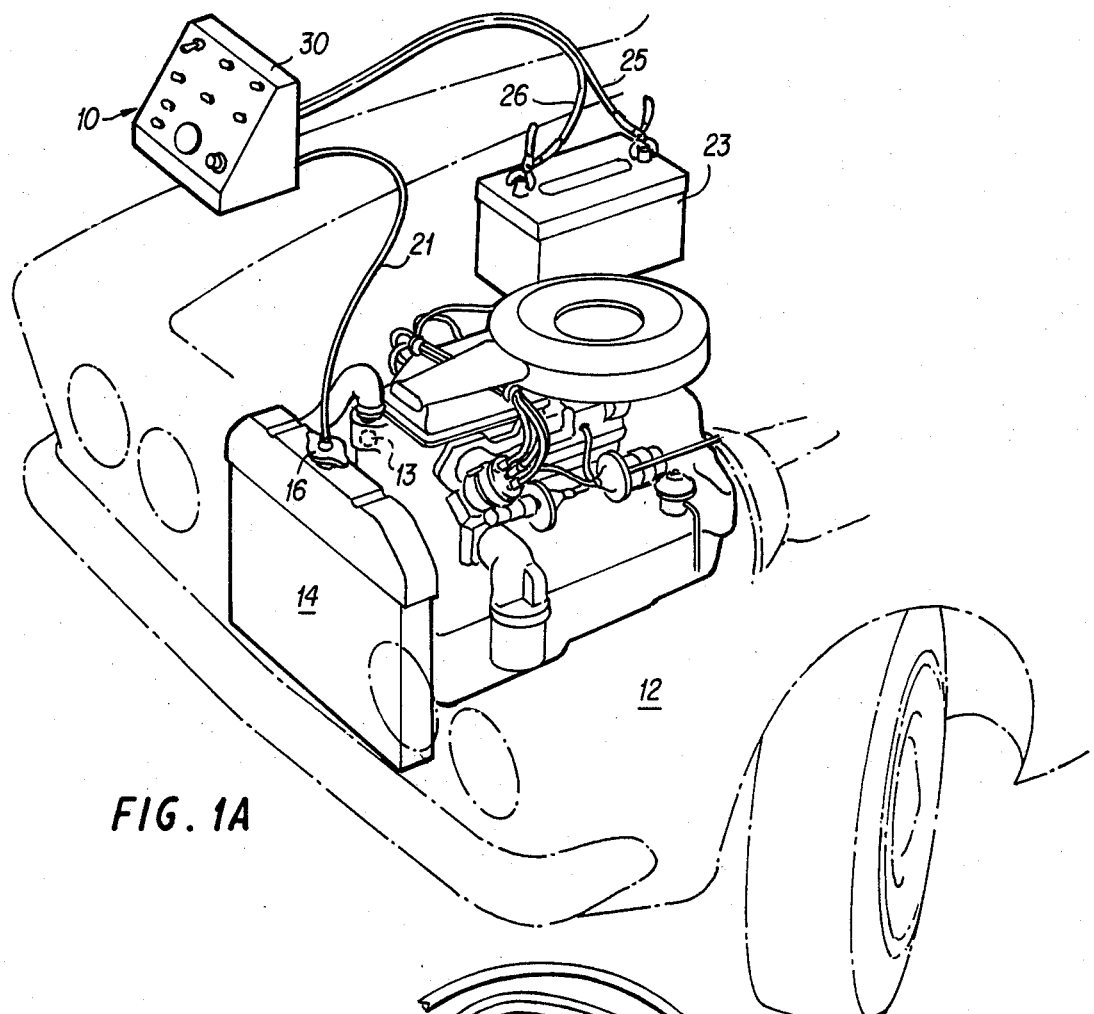
FIGS. 1 and 1B are is a perspective views of the electronic thermostat tester in accordance with the instant invention utilized with a vehicle.

Referring now to FIG. 1, there is shown an electronic thermostat tester, designated generally by the numeral 10, which is used to test the thermostat of a liquid-cooled internal combustion engine 11 in a vehicle 12. The liquid cooled internal combustion engine 11 has a thermostat 13 disposed between it and a radiator 14 which cools liquid circulating through the engine. The radiator 14 has a radiator cap 16, which cap is removed to replace or top up coolant for the engine 11. In some vehicles such as trucks, coolant is added to the cooling system of the engine 11 through a port positioned just in front of the windshield of the truck. Regardless of the vehicle, it is important that access is provided to the cooling circuit at a point which is between the thermostat 13 and radiator 14. In virtually all automotive vehicles with liquid cooled engines, such an access is provided.

In accordance with the instant invention, the thermostat tester 10 has a sensor 20 (FIG. 1B) which is inserted in the radiator 14 to sense at what heat the thermostat 13 opens to permit coolant to flow from the hot engine 11 through to the radiator 14. The sensor 20 is connected to the thermostat tester 10 by a relatively long cable 21 so that the thermostat tester may be conveniently positioned with respect to the vehicle 12 while the thermostat is being tested.

Since the thermostat tester 10 is electronic, it must have some source of power. In accordance with the features of the instant invention, power is obtained by simply connecting the thermostat tester 10 to the battery 23 of the vehicle 12 by positive and negative leads 25 and 26, each of which has a respective conventional battery clamp 27 and 28.

Figure 1B:
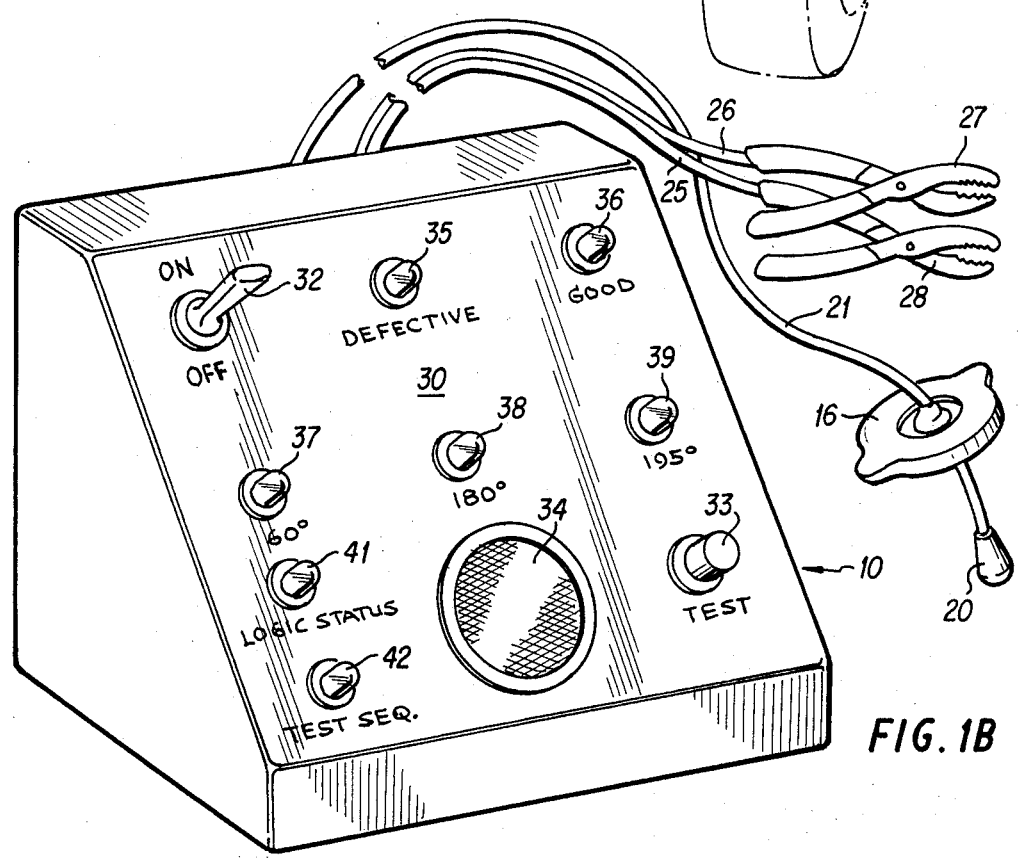

As is seen in FIG. 1B, the thermostat tester 10 includes various indicators and switches located on the front face 30 of the housing of tester 10. There is an ON and OFF switch 32 which simply energizes the system and a test switch 33 which is used to both clear the system and to start a test. A buzzer 34 is used to audibly indicate a defective thermostat 13. At the top of the front plate there is a red light 35 for indicating a defective thermostat 13 and a blue light 36 which indicates a good thermostat. A row of temperature lights 37, 38 and 39 are provided to indicate rated thermostats. Finally, there is a status light 41 for indicating that the circuit is ready for a test and a test sequence light 42 which indicates that the test is underway.

In conducting a test on a standard automobile engine as opposed to a heavy-duty engine, the sensor 20 is inserted in the cooling system of the internal combustion engine 11 between the thermostat and the radiator 14. The positive lead 25 is connected to the positive post of the battery 23 and the negative lead 26 is connected to the negative post of the battery. The vehicle's engine 11 which is at ambient temperature is then started and the engine run at idle. The switch 32 is then turned on to energize the system. Test button 33 is then pressed once to clear any information left in the circuitry of the electronic thermostat tester and then pressed again to start the test sequence.

If within an eight-minute period the red light 35 goes on and the buzzer 34 sounds, then the person conducting the test knows the thermostat 13 is defective. If the blue light 36 goes on, then the electronic thermostat tester is indicating that the thermostat 13 is functioning properly. After the blue light goes on, the engine is run for another six minutes to ascertain from the three lights 37, 38 and 39 if the engine 11 is operating at its rated thermostat. Typically, the rate temperature is determined from the owner's manual or a service manual to be 160° F., 180° F. or 195° F.

Figure 2:
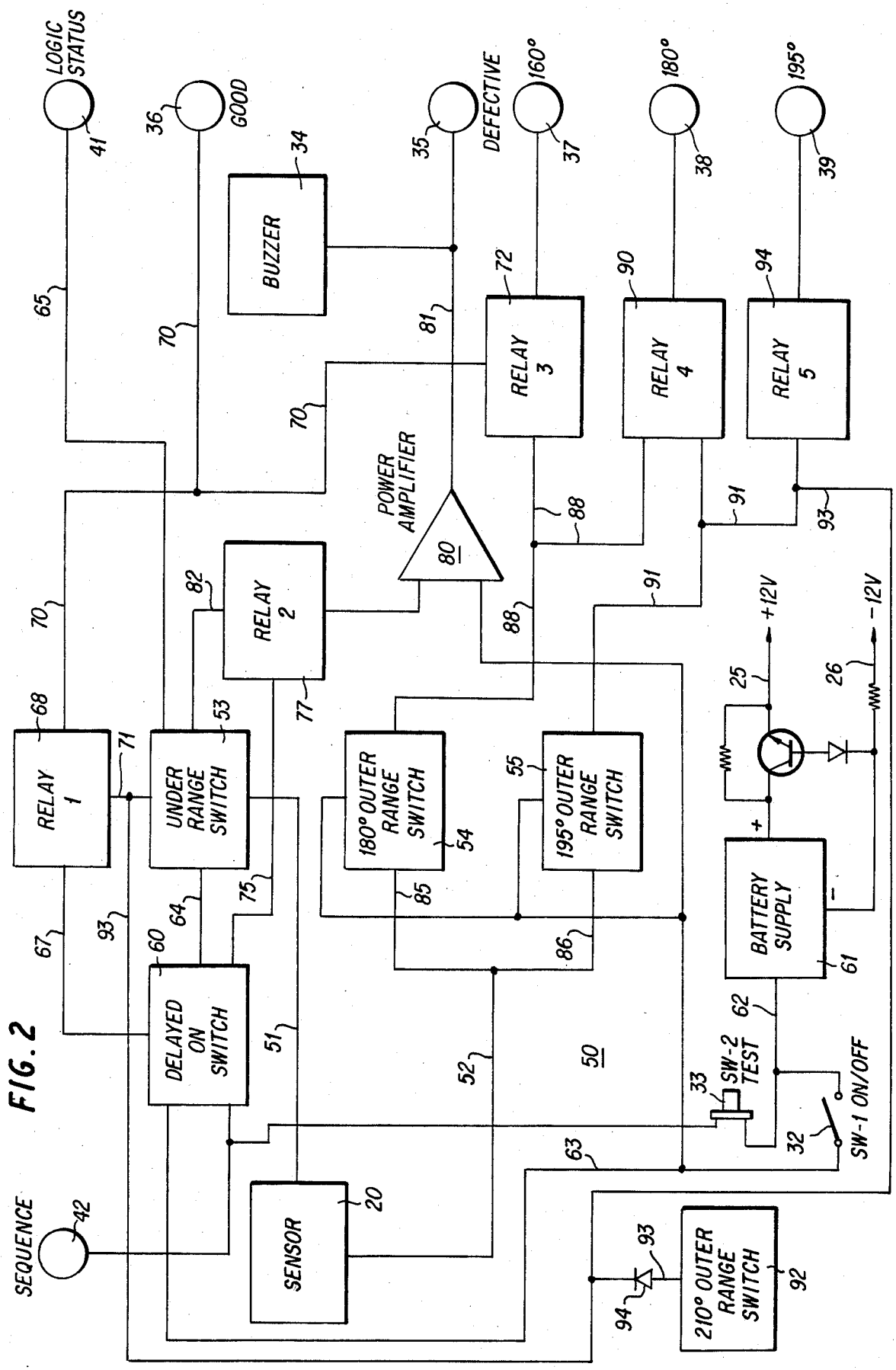
FIG. 2 is a circuit diagram of a circuit within the electronic thermostat tester shown in FIG. 1 illustrating the various components of the test circuit and the interconnection of those components wherein the circuit is particularly suitable for testing the cooling systems of passenger car and light truck engines.

Referring now more specifically to the diagram of FIG. 2, wherein an embodiment of a particular circuit, designated generally by the numeral 50 is disclosed, it is seen that the sensor 20 has two lines, 51 and 52, connected thereto, which lines comprise the cable 21 of FIGS. 1A and 1B. The line 51 is connected directly to an under-range switch 53 whereas the line 52 is connected directly to a 180° F. outer-range switch 54 and a 195° F. outer-range switch 55. The range switches 53, 54 and 55 are each calibrated to respond to a particular heat range. The under-range switch 53 responds to a heat level of 160° and as an output when the heat of the coolant sensed by the sensor 20 reaches 160°. It should be kept in mind that the sensor 20 is between the radiator 14 and the thermostat 13 and therefore senses when the thermostat opens to pass hot coolant from the internal combustion engine 11 to the radiator 14 for cooling.

In order to coordinate the test of the thermostat 13 with operation of the engine 11, a delayed ON switch 60 is included in the circuit 50 in order to monitor the time at which the under-range switch 53 generates an output signal indicating that the thermostat 13 has opened. It is the cooperation of the range switches 53, 54 and 55 with the delayed ON switch 60 which enables the tester 10 to perform its test quickly, reliably, inexpensively and with minimal investment.

To begin a test on, for example, an automobile engine, the on-off switch 32 is closed to energize the circuit 50 by connecting the 12 volt power supply 60 thereto, which 12 volt power supply is connected by lines 25 and 26 to the battery 23. The 12 volt power supply 61 is connected via a line 62 to the circuit 50 through the on-off switch 32. After the on-off switch 32 has been closed, a test sequence switch 33 is pressed once to clear the various components in the circuit 50 of any information left therein by previous tests. Upon pressing the switch 33 the first time, the sequence lamp 42 extinguishes to indicate that the thermostat tester is ready to conduct a test. Upon again pressing the test sequence switch 33 the delayed-on switch 60 begins an eight minute count (first preselected time interval). Simultaneously, the under-range switch 53 is signaled via a signal on line 64 to monitor the sensor 20 so as to sense when the coolant's heat reaches a level equivalent to 160° F. and the logic status lamp 41 is lit by signal over line 65 to indicate that a test is under way.

Connected to the delayed-on switch 60 via a line 67 is a first relay 68. The first relay 68 is connected by a line 70 to the "good" blue lamp 36 which indicates that the thermostat 13 under test is functioning properly. The first relay 68 is also connected by line 71 to the under-range switch 53. If the under-range switch 53 detects a heat equivalent rise to 160° F. thermostat before the delayed-on switch 60 counts eight minutes, then the relay 68 is enabled via a signal on line 71 to close and thereby energize the blue lamp 36. In addition, the line 70 is connected to a second relay 72 which is closed so as to light the 160° F. lamp 37 to specifically indicate that the 160° F. level has been reached. On the other hand, if the delayed-on switch 60 counts a time period of 8 minutes without the under-range switch 53 being tripped, a signal is pressed on line 75 to close a third relay 77 so as to pass a signal over line 78 to a power amplifier 80. The power amplifier 80 is connected by line 81 to the buzzer 34 and the red defect lamp 35 which sound and light simultaneously to indicate a defective thermostat 13. If the under-range switch 53 reaches the 160° F. thermostat level prior to a signal being pressed on line 75, the under-range switch 53 impresses a signal over line 82 which prevents the third relay 77 from energizing the power amplifier 80 thus interrupting its operation and preventing sounding of buzzer 34 and lighting of lamp 35.

Generally, the cooling systems of internal combustion engines 11, used with automobiles, operate at rated thermostat which are either 160° F., 180° F. or 195° F. The lead 52 connecting the sensor 20 to the 180° F. thermostat and 195° F. thermostat outer range switches 54 and 55 is divided with line 85 connected to the outer range switch 54 and line 86 connected to the outer range switch 55. The 180° F. thermostat outer range switch 54 is connected via line 88 to the second relay 72 and to a third relay 90. The third relay 90 is also connected to the 195° F. thermostat outer range switch 55 by a line 91. If the owner's manual or service manual for the particular internal combustion engine 11 being tested shows a 160° thermostat, then only the 160° light 37 should remain on after and additional 6 minute time interval. If the engine 11 is rated at 180° F. thermostat then after expiration of the 6 minute time interval the outer range switch 54 should detect a 180° temperature rise and a signal impressed over line 88 to the first relay 72 and the second relay 90. The signal on line 88 then opens relay 72 and extinguishes the 160° lamp 37. However, the same signal on line 88 closes relay 90 to light the 180° lamp 38, indicating that the thermostat 13 of FIG. 1 is operating properly. If, however, the thermostat 13 is rated at 160° F. and the 180° F. lamp comes on, then the tester 10 knows that the thermostat is letting the coolant get too hot and is therefore defective.

If the engine 11 is rated at 195° F. thermostat then the outer range switch 55 will have an output on line 91 when the sensor 20 senses a 195° F. thermostat. An output on line 91 opens relay 90 to extinguish the 180° lamp 38 and this simply energizes the 195° F. lamp 39. An out-range switch 92 is also provided. The sole purpose of out-range switch 92 is to extinguish lamp 36, lamp 37 and lamp 39 should the heat of the engine go beyond either selected range during the thermostat test interval. The out-range switch 92 also sounds the buzzer 34. This is accomplished by line 93 being connected by way of diode 94 to line 71, line 91 and relay 5. Accordingly, one can determine both if the thermostat 13 under test opens at all and if the thermostat under test is allowing the engine 11 to operate at its rated temperature.

After the test is concluded, the on-off switch 32 is opened and the leads 25 and 26 removed from the battery 23 of the vehicle. If the test indicates that thermostat 13 is not defective then the mechanic knows that there is some other portion of the cooling system which needs attention. Mechanics time is now relatively expensive, while this test is being conducted, a mechanic can attend to other duties and thus operate more efficiently than before.

Figure 5:
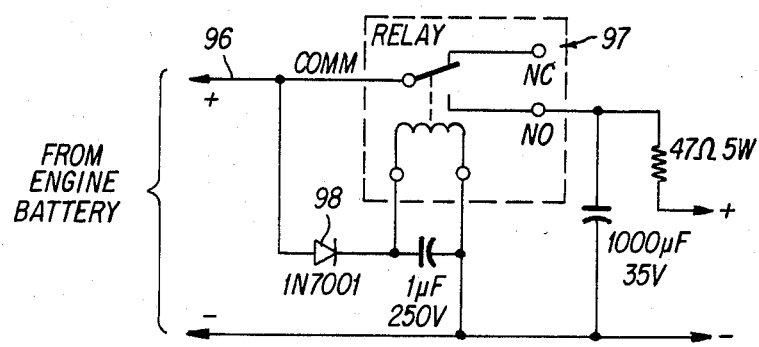
FIG. 5 is a circuit diagram of a protector circuit disposed between the battery and the testing circuit to eliminate interference from a faulty alternator or generator.

In order to prevent damage to the circuit 50, a protective circuit 92 is placed in the line between the battery 23 and the 12-volt power supply 61. The protective circuit 92 protects the circuit 50 from overload, overrange, short circuit and reverse polarity conditions and simply consists of a power transistor Q, (276-2041) and Zener diode D, (5.1 volt 1 w) connected across lines 25 and 26. An alternative protective circuit is shown in FIG. 5.

In conjunction with testing the thermostat 13 of an engine, the tester 10 may be used to test for an obstruction in the cooling circuit of the engine block of internal combustion engine 11. The logic status light is connected through the under-range switch 53 to the sensor 20. If the status light 41 goes out in a shortened selected period of time (second preselected time interval), for example two minutes for an automobile engine, one can determine if the engine block cooling circuit is clogged. This is because if the engine block cooling circuit is clogged, the coolant will heat much faster tripping the under-range switch early.

If the radiator 14 is defective, the logic status light 41 will remain on for a longer selected period of time, for example five minutes (third preselected time interval). This is because when the circulation in the radiator is restricted, the coolant will not reach the sensor 20 fast enough to extinguish the logic status lamp 41 before a standard selected period of time expires (for example, four minutes for an automobile engine). In other words, if there is no restriction in the radiator, the status lamp 41 will extinguish in three to four minutes, but if there is a restriction, the lamp will remain lit longer.

Generally, an automobile engine will run for a selected period of time, for example twelve minutes, before an engine 11 starting from cold reaches a temperature of over 200° F. At 200° F., the clutch of a clutch-type fan engages and the switch of an automatic electric fan closes starting the fan (element 15 of FIG. 1). If the engine 11 runs for twelve minutes or more (fourth preselected time interval) without the fan 15 being activated, the buzzer 34 sounds indicating a defect in the fan or an activating component thereof.

The tester current 50 operates to detect a clogged block or defective clutch fan or electric fan because of the following principles. The same amount of coolant placed into a small container will heat much faster. It will also create more pressure. If the coolant flow is restricted, the coolant will not travel as fast. If the volume of air surrounding the radiator core is not sufficient, the coolant will get hotter than normal within a given time. Accordingly, with a smaller container (clogged block), the red logic light 35 will extinguish in less than 4 minutes instead of extinguishing in about four minutes which happens under normal operating conditions. With a restricted flow (radiator cores blocked), the coolant will not reach the sensor 20 as quickly, which will cause the red logic light 35 to remain on longer than 5 minutes. If a clutch fan or an electrically operated fan is not functioning properly—the red light 5 will be on and the buzzer 35 will sound at whatever thermostat light (160, 180, or 195 degrees) has remained on over 4 minutes. Consequently, a clogged block, defective radiator or improperly operating clutch fan or electric fan controlled by thermostatic switches can easily be pin pointed as a source of trouble.

By utilizing the aforediscussed techniques, considerable time, aggravation and expense is saved in testing cooling systems for defects. Ordinarily, if an automobile thermostat 13 turns out not to be defective, in a cooling system which does not function properly, the engine 11 must sit long enough for the coolant temperature to drop below 150° F. before other tests are conducted. On a hot day, it can take two hours for the temperature to drop below 150° F.. The aforediscussed approach can check out all systems in approximately twelve minutes.

The components used in the circuit 50 of FIG. 2 are readily available and can be easily and inexpensively assembled on a circuit board. In constructing an initial prototype, the inventor used the following components which can be readily purchased from suppliers such as Radio Shack.

| Component | Model No. | Source |
|---|---|---|
| sensor 20 | In 4001 | Radio Shack |
| on-off switch 32 | 275-708 | Radio Shack |
| test sequence switch 33 | 275-618 | Radio Shack |
| buzzer 34 | B-Z4 | All Electrical Corp. Los Angeles, CA |
| defective lamp 35 | 272-323 | Radio Shack |
| blue good lamp 36 | 272-323 | Radio Shack |
| 160° lamp 37 | 272-332 | Radio Shack |
| 180° lamp 38 | 272-331 | Radio Shack |
| 195° lamp 39 | 272-331 | Radio Shack |
| logic status lamp | 272-332 | Radio Shack |
| sequence lamp 42 | 272-331 | Radio Shack |
| under-range switch 53 | SEE FIG. #3 | |
| outer-range switch 54 | SEE FIG. #3 | |
| outer-range switch 55 | SEE FIG. #3 | |
| 12-volt battery supply 61 | | |
| first relay 68 | 603-3455 | Omnitronics |

-continued

| Component | Model No. | Source |
|---|---|---|
| | CDE 1077 | of N.Y.C. |
| second relay 72 | 275-247 | Radio Shack |
| third relay 77 | 275-247 | Radio Shack |
| power amplifier 80 | 276-2041 | Radio Shack |
| fourth relay 90 | 275-247 | Radio Shack |

Figure 3A:
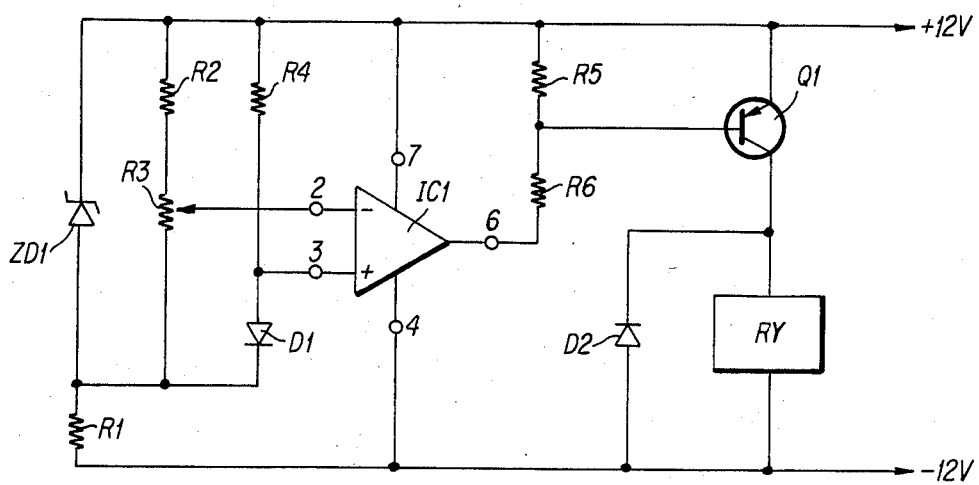
Figure 3B:
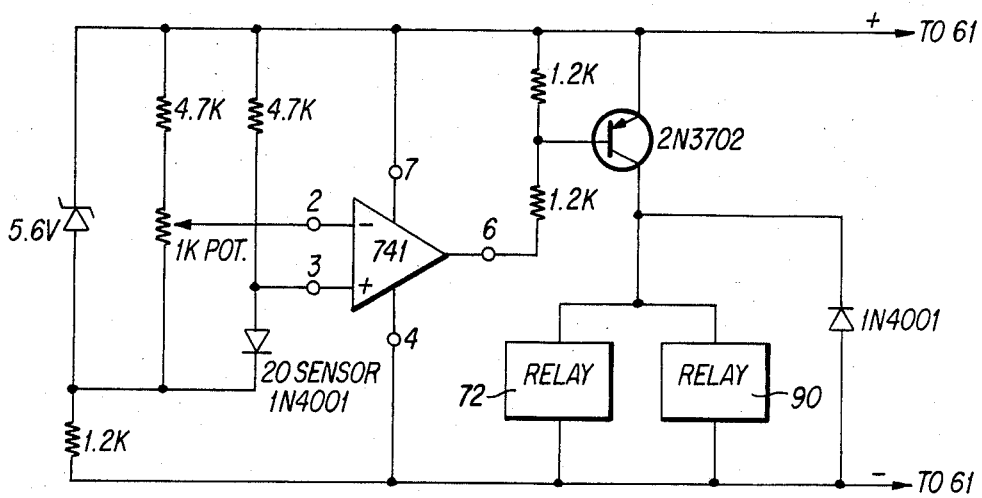
FIGS. 3B–3D are circuit diagrams showing switches similar to that of FIG. 3A but configured for use as out-range or over-range switches.
Figure 3C:
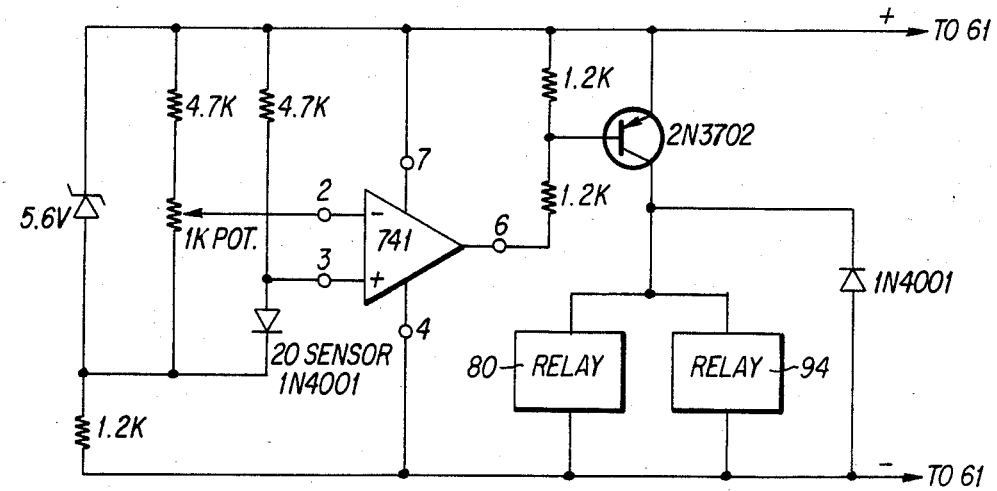
Figure 3D:
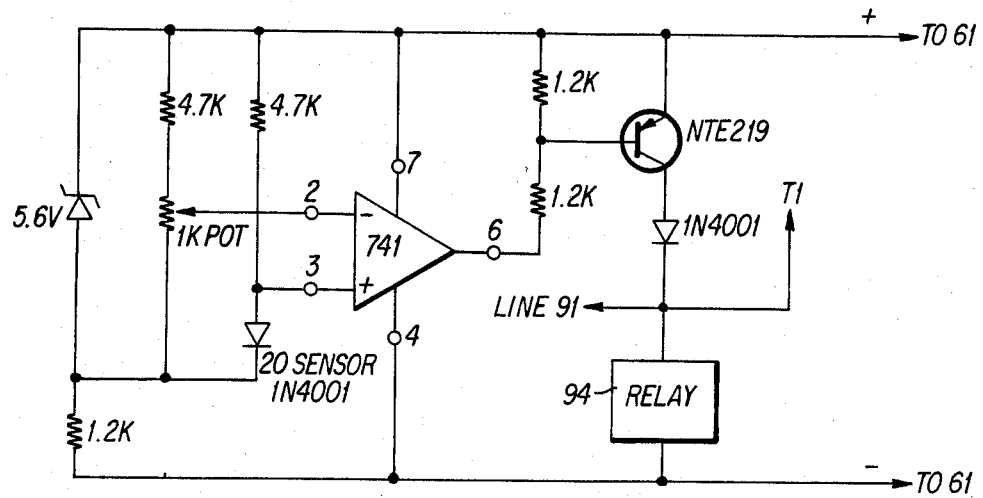

Referring now to FIG. 3A, there is shown a typical switching circuit which is used as an under-range switch for the circuit 53 of FIG. 2. Similar circuits shown in FIGS. 3B, 3C and 3D are used as out-range switches 54, 55 and 92, respectively in the circuit of FIG. 2. Generally, the under-range switch 53 operates in a positive temperature coefficient mode whereas the out-range switches 54, 55 and 92 operate in a negative temperature coefficient mode.

In the switch of FIG. 3A, current is fed to zener diode ZD1, via R1 so that stabilized potential of 5.6 V is developed across ZD1. This stabilized voltage is used to generate constant current in silicon diode D1 via resistor R4. It also generates a stabilized voltage in variable resistant R3 via resistor R2. With this arrangement, a heat dependent voltage is developed on the noninverting (positive terminal) of a 741 operational amplifier (IC1). Also a fixed reference potential on the negative (inverting) terminal of IC1 is developed when the value of reference potential is adjuxtaposed via resistor R3. The standing voltage of the diode (D1) is cancelled out to give a purely heat dependent differential voltage between the negative and the positive terminal of the operational amplifier. Now if variable resistor R3 is adjusted to give a zero voltage at the required trip heat, should the temperature cause the voltage to rise above this voltage level, the forward voltage of D1 will fall which will cause the positive terminal of (IC1) operational amplifier to become negative with respect to the negative terminal thereof. When this happens, the operational amplifier (IC1) goes into negative saturation. Since Q1 is a P channel transistor (a negative voltage causes it to turn on)—thus pulling in/or turning on relay RY1 which is relay 77 in FIG. 2. A diode is used here instead of a thermistor because of the low temperature requirement. With a silicon diode about 600 micro watts of power are dissipated at currents of IMA. This renders any self-heating effects negligible. This set-up gives this circuit around 0.05 of a degree centrigrade accuracy.

The circuits of FIGS. 3B and 3C are similar to FIG. 3A, except that the positive terminal of IC1 is connected to variable resistor R3 rather than the negative terminal.

By changing the terminals in the operational amplifier IC1 which are connected to the variable resistor $R_3$, the circuit will go into saturation when the heat level is the set amount in FIG. 3A and over the set amount in FIGS. 3B, 3C and 3D.

Figure 4:
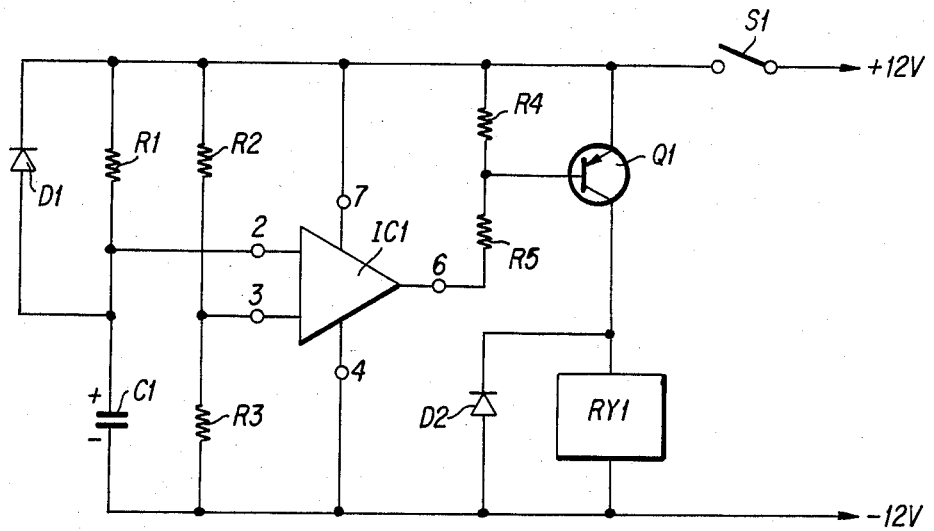
FIG. 4 is a circuit diagram of a typical timing circuit used with the logic of the system of FIG. 2.

The circuits of FIGS. 3A–3D each generally contain the following components:
Diodes—$D_1$, $D_2$-1H4001
Operational Amplifier—1C1-741 Op. Amp.
P channel Transistor Q1-276-2043
Resistors $R_1$, $R_5$, $R_6$—1.2K
Resistors $R_2$, $R_4$—4.7K
Variable Resistor $R_3$—1000 ohm pot
Relay Ry1—Ry5—any 12 volt relay
Zener Diode ZD1—5.6 V 1 W Zener Diode Referring now to FIG. 4, there is shown a time-activated switch which can be used as the delayed-on switch 60 of FIG. 2. The time-activated switch of FIG. 6 is similar in configuration to the switches of FIGS. 3A–3D; however, the switch of FIG. 6 operates as follows.

When switch S1 is first closed, capacitor C 1 is fully discharged; therefore, the inverting terminal of operational (IC1) is shorted to ground for this interval, and the non-inverting terminal K (pin# 3) is held positive via the voltage divider which consists of resistor R2 and resistor R3. Under this situation, the output of operational amplifier (IC 1) is driven into saturation. Therefore, transistor Q 1 and relay RY 1 are both cut off. Capacitor C 1 starts to charge exponentially via resistor R1 as soon as switch SW 1 is closed. After a preset time (when C 1 is fully charged) the inverting terminal voltage rises above the voltage of the non-inverting terminal. At this point the operational amplifier (IC 1) comes out of saturation causing transistor Q 1 to conduct, and this turns on/or pulls in relay RY 1. Diode D 1 is used in this circuit to rapidly discharge C 1 via the low value resistors R 2 and R 3 when switch S 1 is opened. This in turn gives the circuit a rapid reset time. Naturally, the time constant of the circuit can be varied via R 1 and C 1. This enables one to set a finite time as to when an event should take place. (Such as how long it takes a thermostat to open or how long the coolant should take to reach the sensor).

Referring now to FIG. 5, there is shown an alternative protector circuit 96 which is used to eliminate the possibility of a faulty alternator or generator in the engine 11 from interfering with the test circuit 50 of FIG. 2. The circuit 96 is connected between the battery 23 (FIG. 1A) and the test circuit 50 and includes a circuit breaking relay 97 in series with the positive line which opens in case of an overload or short. A silicon diode 98 is connected to the relay 97 so as to open the relay if polarity is mistakenly reversed. The circuit 96 includes the following components:

1—Relay 97—Part# 683-3455 (Omnitron)
1—Silicone Diode 98 # 7001
1—10 uF Capacitor 150 WWVDC
1—1000 uF capacitor 35 WWDC
1—47 0.5 w resistor.

Heavy-duty vehicles such as trucks, buses, bulldozers and the like require a testing device which operates under heat and time parameters which differ from the parameters under which an automobile engine operates. In all other respects, the tester 10 used for heavy-duty vehicles is the same as that used for automobiles.

Heavy-duty vehicles run as cool as possible. Their cooling system capacity is about four times that of a large automobile. Likewise, the area of the radiator is about four times that of a large automobile. Conversely, an automobile engine runs as hot as possible. Some automobile engines run as hot as 210° F., while heavy-duty equipment generally operates at 160° or 180° F.

The average automobile radiator holds about one-third the vehicle's coolant capacity, therefore, it can only transfer about 150,000 BTU's per hour. Whereas, with the average heavy duty equipment, the coolant capacity is about 4 times the capacity of an automobile engine. Therefore, heavy-duty testing requires a time and heat program different from the program of the automobile. For example, utilizing the instant invention, it takes approximately twenty-eight minutes to test a thermostat used in heavy-duty equipment but only ten minutes to test the thermostat of a passenger car.

In a typical test procedure for heavy-duty equipment, it is possible to run tests whether the filler tank is connected to the "block" or the "radiator". In this procedure, the coolant capacity is compensated for. The wiring component parts, etc., in the heavy-duty tester are essentially the same as they are in the automobile tester. However, the test procedure is somewhat different and comprises the following steps:

(1) A large rag or towel is used to remove the radiator pressure cap 16 and the sensor 22 is installed in place of cap.

(2) The positive terminal 25 of the tester is connected to a positive 12 V supply; and negative terminal 26 of the tester 10 is connected to group or a negative 12 V supply.

(3) The engine is started and let run for five minutes.

(4) The engine is then revved up to 2000 rpm for five minutes.

(5) The tester switch 32 is switched to the "on" position.

(6) The test button 33 is pressed once to cancel old information.

(7) The teste button 33 is pressed a second time to start test sequence.

(8) The eight minutes either (a) the red light 35 will be illuminated and the buzzer 35 will sound to denote a defective thermostat; or (b) the blue light 36 will illuminate to show a good thermostat.

(9) The heavy-duty engine is then run an additional ten minutes to ascertain the operating temperature thereof.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An apparatus for testing the condition of liquid cooling systems of internal combustion engines, wherein a thermostat is disposed in coolant of a cooling system between a radiator and an engine, the device comprising:

a heat sensor for placement in the coolant between the radiator and thermostat;

time counting means for counting a preselected time interval selected to correspond to the time interval in which the coolant should reach a first preselected heat level;

means connected to the time counting means for starting operation thereof upon commencing testing of the cooling system;

an under-range switch means connected to the heat sensor for detecting when the cooling system reaches the first preselected temperature;

a first indicating means for indicating that the coolant has reached the first preselected heat level;

relay means connected to the under-range switch, the time counting means and the first indicating means for interrupting operation of the first indicating means if the time counting means signals an end to the time interval before the under-range switch detects that the sensor has reached the preselected heat level;

second indicating means for providing a defect signal when the time counting means signals the end of the first preselected time interval;

first connecting means for connecting the second indicating means to the time first connecting means, said counting means including second relay means connected between the second indicating means and time counting means and being connected to the under-range switch for interrupting transmission of the time interval signal to the second indicating means to prevent issuance of a defect signal;

outer-range switch means connected to the heat sensor for detecting when the coolant reaches at least one upper heat level limit higher than the first preselected temperature;

at least one additional indicating means for indicating that the upper temperature limit has been reached, second connecting means for connecting the outer range switch means to the additional indicating means; said second connecting means including third relay means connected between the additional indicating means and outer-range switch means for interrupting operation of the addition indicating means if the outer-range switch means does not detect that the coolant has reached the upper heat level limit, whereby the first, second and third relay means enable the associated indicating means to indicate a condition of the cooling system if that condition is indicative of the true state of the cooling system and interrupt an associated indicating means if the condition indicated by the indicating means is not indicative of the true state of the cooling system.

2. The apparatus of claim 1, wherein the outer-range switch means comprises at least two outer-range switches, one of which is set at a higher preselected heat level than the other and wherein there is an additional indicating means connected to each outer-range switch means for indicating when the heat level detected thereby reaches the preselected temperature.

3. The apparatus of claim 2, wherein there is a third outer-range switch means set at a maximum heat level, indicating means being connected to the third outer-range switch to indicate that the maximum temperature level has been exceeded.

4. The apparatus of claim 3, wherein the indicating means is the second indicating means for indicating a defect in the cooling system.

5. The apparatus of claim 2, wherein the first relay means is connected to a fourth relay means and wherein the first indicating means includes a first heat level indicating lamp connected to the fourth relay means, the fourth relay means being connect to the first relay means and energizing the lamp upon being closed upon closing first relay means, the fourth relay means also being connected to the first outer-range switch and being opened upon the first outer-range switch detecting the preselected high heat level to extinguish the first heat level indicating lamp, the additional indicating means including at least one second heat level indicating lamp which second heat level indicating lamp becomes lit upon extinguishing the thermostat indicating lamp.

6. The apparatus of claim 5, further including a test switch connected between a power supply and delayed "ON" switch, a sequence lamp and a logic status, which lamps are lit upon closing the test switch.

7. The apparatus of claim 1, further including power supply means wherein the power supply means is a 12 volt power supply for connection to a battery associated with the internal combustion engine.

8. The apparatus of claim 1, wherein the first indicating means includes indicating lamps and the second indicating means includes an audible alarm.

9. The apparatus of claim 8 wherein the logic status lamp is directly connected to the under-range switch and is extinguishing when the heat level reaches the preselected heat level enabling an observer to determine that engine block is clogged if the logic status light extinguishes before a first preselected time or after a second preselected time.

10. A method for testing a liquid cooling system of an internal combustion engine which cooling system includes a thermally activated fan, a radiator, and an engine block cooling circuit with a thermostat disposed between the radiator and the cooling circuit, the method comprising the steps of:

starting the engine from room temperature;

starting a clock to measure a first preselected time interval;

sensing heat levels in the cooling system at a location between the radiator and thermostat;

detecting with an under-range switch when the cooling system liquid reaches a first preselected heat level which level is the heat level at which the thermostat opens;

indicating with a first indicator, indicative of a good thermostat, that the cooling system liquid has reached the first preselected heat level;

interrupting operation of the first indicator if the clock signals an end of the first preselected time interval before the under-range switch detects that the sensor has reached the first preselected heat level;

providing a thermostat defect signal with a second indicator when the clock signals an end of the first preselected time interval; and interrupting transmission of the time interval signal to the second indicator to prevent issuance of a defect signal if the cooling system liquid reaches the first preselected heat level before the first time interval runs to prevent issuance of a defect signal.

11. The method of claim 10 further including the steps of:

indicating operating heat levels with first and second preselected outer-range lamps; and extinguishing the lamps indicative of a lower heat level and lighting the lamps indicative of a higher heat level as detected temperature level rises.

12. The method of claim 11 further including the steps of:

selecting a second preselected time interval starting when the clock starts, wherein the second preselected time interval is shorter than the first preselected time interval;

selected a third preselected time interval, starting when the clock starts, wherein the third preselected time interval is longer than the second preselected time interval and shorter than the first preselected time interval;

monitoring an indicator connected to the under-range switch which indicator changes when the under-range switch detects the first preselected time interval, whereby a determination of a clogged block can be made if the indicator changes prior to expiration of the second time interval and a determination of a defective radiator can be made if the indicator does not change prior to the expiration of the third time interval.

13. The method of claim 12 further including the steps of: selecting a fourth preselected time interval longer than the first time interval and observing the electric fan wherein if the fan does not operate before expiration of the fourth time interval a determination is made that the thermally activated fan is defective.

14. The method of claim 10 wherein the first indicator is a light and wherein the second indicator emits an audible signal.

* * * * *